United States Patent [19]

Koyama et al.

[11] 3,949,167
[45] Apr. 6, 1976

[54] IMAGE-PROJECTION SYSTEM

[75] Inventors: Kuniyoshi Koyama, Chofu; Yoji Ishikawa, Tokyo, both of Japan

[73] Assignee: Sony Corporation, Tokyo, Japan

[22] Filed: Dec. 12, 1973

[21] Appl. No.: 424,072

[30] Foreign Application Priority Data
Dec. 20, 1972 Japan............................. 47-146558

[52] U.S. Cl.............................. 178/7.5 D; 315/370
[51] Int. Cl.$^2$........................................... H04N 3/16
[58] Field of Search ......... 315/370, 276 D; 178/7.7, 178/7.5 D, 7.88, 7.85

[56] References Cited
UNITED STATES PATENTS

| | | | |
|---|---|---|---|
| 2,176,973 | 10/1939 | Bowman-Manifold.............. | 315/370 |
| 2,344,736 | 4/1944 | Schade............................ | 315/276 D |
| 2,661,443 | 12/1953 | Smith................................ | 315/370 |
| 2,999,126 | 9/1961 | Harries et al. ..................... | 178/7.88 |
| 3,329,861 | 7/1967 | Barkow et al...................... | 315/370 |
| 3,469,026 | 9/1969 | Winik et al. .................. | 178/7.85 X |
| 3,700,958 | 10/1972 | Haferl............................. | 315/276 D |
| 3,710,171 | 1/1973 | Rhee................................ | 315/276 D |
| 3,723,805 | 3/1973 | Scarpino et al..................... | 315/370 |
| 3,836,926 | 9/1974 | Seitz et al. ............................. | 354/76 |

*Primary Examiner*—Robert L. Griffin
*Assistant Examiner*—Aristotelis M. Psitos
*Attorney, Agent, or Firm*—Lewis H. Eslinger; Alvin Sinderbrand

[57] ABSTRACT

An image projection system having an image projector and a concave viewing screen, in which the image projector comprises a cathode raytube, a horizontal and a vertical deflecting coil for beam scanning in the cathode ray tube, and a projection lens, and the amplitude of scanning currents supplied to the horizontal and the vertical deflecting coil is controlled in vertical and horizontal scanning periods respectively, so that trapezoid-shaped and fan-shaped distortions in the projected image on the viewing screen are compensated for.

5 Claims, 9 Drawing Figures

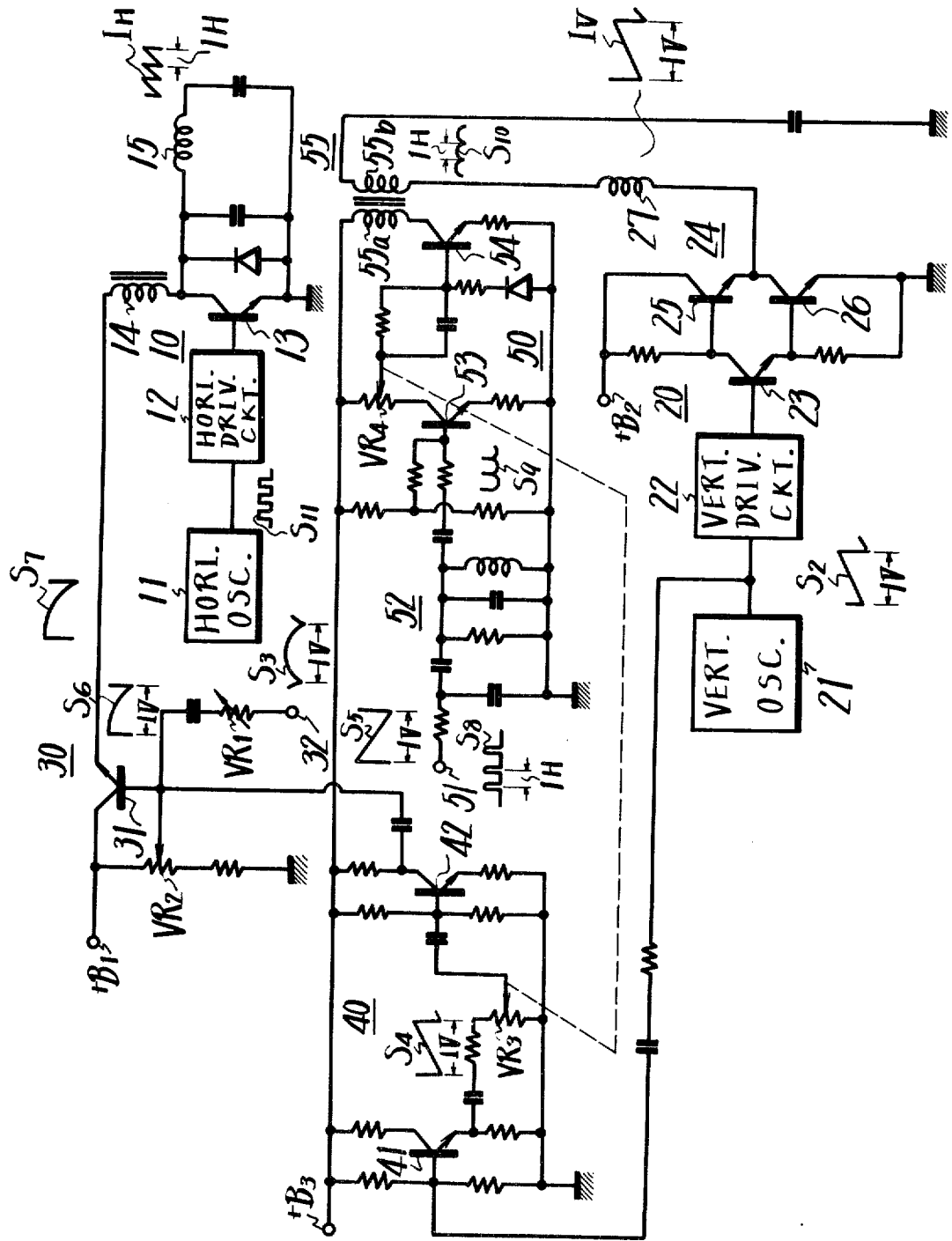

IMAGE-PROJECTION SYSTEM

BACKGROUND OF THE INVENTION

1. Field of the Invention

This invention relates generally to a television receiver, and more particular to such a television receiver of the projection type which projects an image formed on the cathode ray tube used in the television receiver onto a viewing screen.

2. Description of the Prior Art

A television receiver of the projection type is known in the prior art. However, the image projection system in the prior art can use only a viewing screen with a flat plane.

Generally, a light beam from the projector is projected onto a screen with an angle of elevation for avoiding an obstruction of the viewing field caused from the projector. In this case the projected raster on the screen has a trapezoid-shaped distortion, but this distortion can be compensated for relatively easily.

But, in the case where a concave screen is used for coinciding a focal plane and for increasing the brightness of the projected picture, the projected picture on the screen has a complex raster distortion and this distortion can't be compensated for easily.

SUMMARY OF THE INVENTION

The picture formed on the screen of the cathode ray tube of an image projector is projected onto a concave viewing screen, and the amplitude of a horizontal and a vertical deflecting current supplied to a horizontal and a vertical deflection yoke of the cathode ray tube is controlled simultaneously by correcting signals having a vertical and a horizontal period respectively, whereby the distortions of the projected raster on the viewing screen are compensated for.

It is an object of this invention to provide an image projection system which can project a picture with no distortion on a viewing screen.

It is another object of this invention to provide a compensating circuit which can compensate for a trapezoid-shaped distortion of the projected picture on the view screen caused from an oblique incidence of a light beam against the screen.

It is a further object of this invention to provide a compensating circuit which can compensate for a fan-shaped distortion of the projected picture on the screen caused from a curvature of the concave screen.

It is a still further object of this invention to provide a compensating circuit which can compensate for the trapezoid-shaped distortion and the fan-shaped distortion simultaneously.

BRIEF DESCRIPTION OF THE DRAWINGS

FIG. 7 is a schematic circuit diagram of the compensating circuit according to the present invention.

DESCRIPTION OF THE PREFERRED EMBODIMENTS

Figure 1:
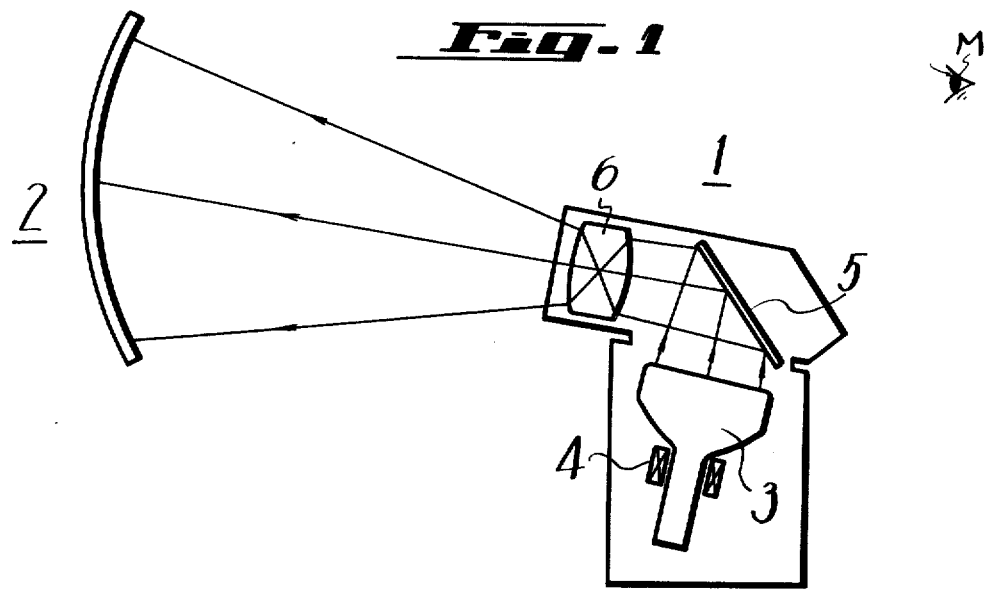
FIG. 1 shows a fundamental optical system of an image projection system corresponding to this invention.

Referring now to FIG. 1 of the drawings, a fundamental optical relationship of the image projection system according to this invention will be now described. An image projector 1 includes a cathode ray tube 3, a deflection coil 4, a reflecting mirror 5 and a projection lens 6. An electron beam of the cathode ray tube 3 is deflected horizontally and vertically by the deflection coil 4 and forms a raster on the screen of the cathode ray tube 3. A light beam from the raster formed on the screen of the cathode ray tube 3 is reflected by the mirror 5 and projected on a concave viewing screen 2 through the projecting lens 6. And, the reflected light on the screen 2 reaches viewer's eye M.

Figure 2:
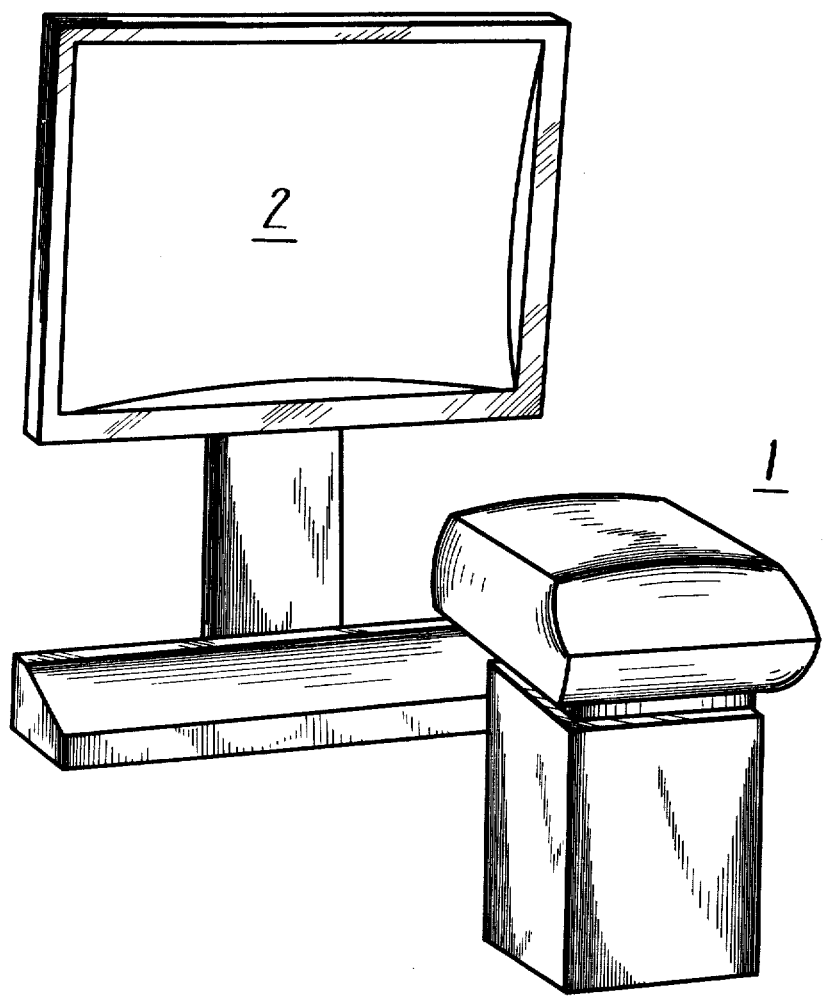
FIG. 2 shows a perspective view of the image projection system depicted in FIG. 1.

A practical installation of the image projector 1 and the screen 2 of this image projection system are shown in FIG. 2, by way of example. In this case, the picture formed on the cathode ray tube is projected onto the viewing screen 2 obliquely for avoiding a view-field obstruction caused from the image projector 1, so that the projected picture on the viewing screen 2 has a trapezoid-shaped distortion as shown in FIG. 3 even if a flat plane screen is used as the viewing screen 2.

Moreover, the concave screen 2 is used in this invention for increasing the brightness of the reflected light thereon and for coinciding a focal plane of the image projector 1 using the cathode ray tube 3 having a convex panel with the surface of the screen 2. So, the projected picture on the screen 2 has not only the trapezoid-shaped distortion as shown in FIG. 3 caused by the oblique incidence of the light beam, but also has a fan-shaped distortion as shown in FIG. 4 caused by the curvature of the concave screen 2. The degree of these distortions vary in response to an angle of elevation of the projecting axis of the projector 1. In this invention, the projecting axis of the projector 1 is varied in response to a distance between the projector 1 and the viewing screen 2, so the degree of the distortions vary in response to the distance between the projector 1 and the screen 2. That is, the degree of the distortions is emphasized when the distance between the projector 1 and the screen 2 is shortened.

Figure 3:
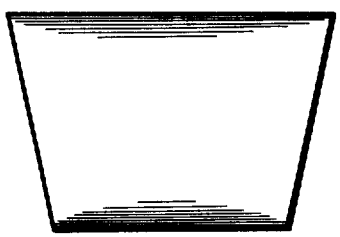
FIG. 3 and FIG. 4 show projected raster patterns on the viewing screen of a cathode ray tube when no compensating circuit is provided.
Figure 5:
FIG. 5 and FIG. 6 show raster patterns on the viewing screen of the cathode ray tube when a compensating circuit according to the invention is provided.
Figure 4:
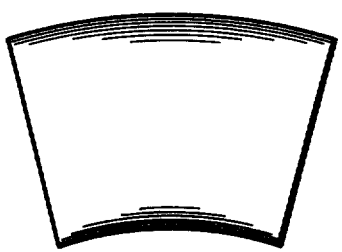
Figure 6:

In this invention, the above mentioned trapezoid-shaped distortion shown in FIG. 3 will be compensated for by deforming the raster pattern formed on the cathode ray tube 3, as shown in FIG. 5 and the above mentioned fan-shaped distortion shown in FIG. 4 will be compensated for be deforming the raster pattern formed on the cathode ray tube 3 as shown in FIG. 6. That is, the raster distortions that appeared on the screen 2 can be compensated for by deforming the rasters formed on the cathode ray tube 3 contrary to the distorted raster patterns formed on the screen 2 by the compensating circuit.

A practical embodiment of the compensating circuit of this invention is shown in FIG. 7, by way of example. In FIG. 7, a horizontal deflecting circuit 10 and a vertical deflecting circuit 20 are constructed by a conventional manner. That is, the horizontal deflecting circuit 10 includes a horizontal oscillator 11, a horizontal driving circuit 12, a horizontal output transistor 13, a horizontal output transformer 14 and a horizontal deflection coil 15. An operation voltage for the transistor 13 is supplied through the transformer 14. A horizontal pulse signal $S_1$ from the oscillator 11 is supplied to the transistor 13 through the driving circuit 12 and a saw-tooth-shaped horizontal deflecting current $I_H$ of a horizontal period 1H flows through the horizontal deflection coil 15. While, the vertical deflecting circuit 20 includes a vertical oscillator 21, a vertical driving circuit 22, a phase split transistor 23, a S.E.P.P. (single-ended push-pull) type vertical output circuit 24 including transistors 25 and 26 and a vertical deflection coil 27. An operation voltage for the vertical output circuit 24 is supplied from a power source terminal $+B_2$. A saw-tooth-shaped driving signal $S_2$ having a vertical period of 1V is supplied to the vertical output circuit 24 through the driving circuit 22, and transistor 23, a saw-tooth-shaped vertical deflecting current $I_V$ of the vertical period 1V flows through the vertical deflection coil 27.

A side-pincushion correcting circuit 30 is provided in this invention for correcting a raster pattern distortion on the cathode ray tube 3 caused from the curvature of the front panel of the cathode ray tube 3. A current control transistor 31 is inserted between a power source terminal $+B_1$ and the horizontal output transistor 13. A parabolic signal $S_3$ having a vertical period of 1V is supplied to the base electrode of the transistor 31 through a correcting signal input terminal 32 and a variable resistor VR1.

The amplitude of the horizontal deflecting current $I_H$ is modulated in response to the parabolic signal $S_3$ having the vertical period 1V, so the side-pincushion distortion of the raster pattern on the cathode ray tube 3 can be compensated for. The variable resistor VR1 and an additional variable resistor VR2 are used for adjusting the degree of correction for the side-pincushion distortion and the horizontal width of the raster on the cathode ray tube 3.

Figure 8A:
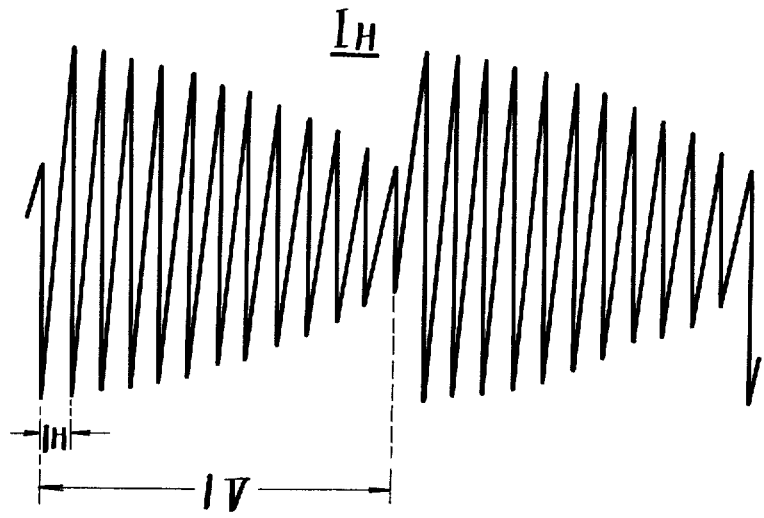
FIG. 8A and FIG. 8B are waveform charts used for explaining the operation of the compensating circuit shown in FIG. 7.

A trapezoid-shaped distortion compensating circuit 40 is also provided which comprises a transistor 41 and a transistor 42. The output signal $S_2$ from the vertical oscillator 21 is supplied to the base electrode of the transistor 41. An output signal $S_4$ of the vertical period 1V from the transistor 41 is supplied to the base electrode of the transistor 42 through a variable resistor VR3 and an output signal $S_5$ of the vertical period 1V from the transistor 42 is supplied to the base electrode of the transistor 31 as a correcting signal for the trapezoid-shaped distortion. The variable resistor VR3 is used for adjusting the amplitude of the correcting signal $S_5$ in response to the degree of the trapezoid-shaped distortion. The parabolic signal $S_3$ and the saw-tooth-shaped signal $S_5$ are mixed at the base electrode of the transistor 31, so a composite signal $S_6$ of the vertical period 1V is supplied to the base electrode of the transistor 31 and a modulated current signal $S_7$ is supplied to the horizontal output transistor 13 from the side-pincushion correcting circuit 30. The amplitude of the horizontal deflecting current $I_H$ is modulated by the correcting signal $S_7$ in response to the vertical period as shown in FIG. 8A. This means that the deformed raster pattern having a wide width at the up-side, and a narrow width at the down-side is obtained on the cathode ray tube 3 as shown in FIG. 5. The direction of this raster distortion on the cathode ray tube 3 is selected inversely to the direction of the raster distortion on the viewing screen 2. Accordingly, the trapezoid-shaped raster distortion as shown in FIG. 3 can be compensated for and a rectangular raster pattern can be obtained on the viewing screen 2.

Figure 8B:
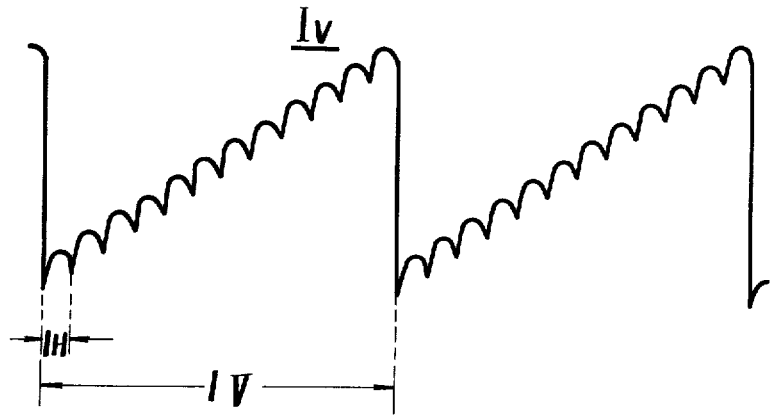

The fan-shaped distortion compensating circuit 50 includes a waveforming circuit 52, a transistor 53, a transistor 54 and a transformer 55. A horizontal pulse signal $S_8$ of the horizontal period 1H supplied to an input terminal 51 is converted to a horizontal parabolic signal $S_9$ by the waveforming circuit 52 and then supplied to the base electrode of the transistor 53. The output signal from the transistor 53 is supplied to the base electrode of the transistor 54 through a variable resistor VR4. The variable resistor VR4 is used for adjusting the amplitude of a correcting signal $S_{10}$ of the horizontal period 1H obtained at a secondary winding 55b of the transformer 55 in response to the degree of the fan-shaped distortion. A primary winding 55a of the transformer 55 is connected to the transistor 54 in series and the secondary winding 55b of the transformer 55 is connected to the vertical deflection coil 27 in series. The parabolic correcting signal $S_{10}$ having the horizontal period of 1H is superposed on the vertical delfecting current signal $I_V$ as shown in FIG. 8B. This means that a center portion of the each horizontal scanning line of the raster on the cathode ray tube 3 is biased downward as shown in FIG. 6. The direction of this raster distortion on the cathode ray tube 3 is selected inversely to the direction of the raster distortion as shown in FIG) 4 is compensated for and a rectangular raster pattern can be obtained on the viewing screen 2.

In this invention, the variable resistor VR3 for the trapezoid-shaped distortion compensating circuit 40 and the variable resistor VR4 for the fan-shaped distortion compensating circuit 50 are ganged, so by adjusting a single control knob (not shown) connected to the variable resistor VR3 and the variable resistor VR4 in response to the distance between the projector 1 and the viewing screen 2 the trapezoid-shaped distortion and the fan-shaped distortion on the screen 2 can be compensated for simultaneously. So it is easy to compensate for the distortions of the raster on the screen 2.

The above description is given to only one preferred embodiment of the present invention, but there is no reason to limit the invention to the described embodiment. It will be apparent that many modifications and variations can be effected without departing from the spirit or scope of the novel concepts of the present invention and hence the scope of the invention should be determined by the appended claims.

We claim as our invention:

1. An image projection system comprising: image reproducing means including a cathode ray tube for producing an image on the screen of said cathode ray tube; projection lens means for projecting the image produced on the screen of said cathode ray tube onto a viewing screen, said viewing screen having a surface concaved at least in the horizontal direction for displaying an image having an inherent trapezoid-shaped distortion and an inherent fan-shaped distortion; horizontal and vertical deflection means producing horizontal and vertical deflecting signals for deflecting electron beams in said cathode ray tube, said horizontal deflection means including first compensating means to modify the horizontal deflection signal at a vertical deflection rate said first compensating means comprises modulating means for modulating a sawtooth-shaped horizontal deflecting current with a substantially sawtooth-shaped correcting signal having a vertical deflection period for controlling the beam deflection horizontally so that said image produced on said cathode ray tube viewing screen has a trapezoid-shaped distortion which is inversely related to said inherent trapezoid-shaped distortion; and said vertical deflection means including second compensation means to modify the vertical deflection signal at a horizontal deflection rate said second compensating means comprises means for superposing a parabolic-shaped correcting signal having a horizontal deflection period on a vertical deflecting current for controlling the beam deflection vertically so that said image produced on said cathode ray tube viewing screen has a fan-shaped distortion which is inversely related to said inherent fan-shaped distortion, whereby said image produced on said screen of said cathode ray tube is predistorted to compensate for said inherent trapezoid-shaped and fan-shaped distortions in said displayed image projected on said viewing screen.

2. An image projection system according to claim 1 wherein said first compensating means further includes first variable means for varying the amplitude of said substantially saw-tooth shaped correcting signal and said second compensating means further includes second variable means for varying the amplitude of said parabolic-shaped correcting signal.

3. An image projection system according to claim 1 wherein said first compensating means further comprises pincushion correcting circuit means for receiving a parabolic-shaped signal having a vertical deflection period and a sawtooth-shaped signal having a vertical deflection period and for mixing said received signals to produce a composite correcting signal for modulating said horizontal deflecting current.

4. An image projection system according to claim 1 wherein said second compensating means further comprises waveforming circuit means for receiving a pulse signal having a horizontal deflection period and for producing said parabolic-shaped correcting signal therefrom to be superposed onto said vertical deflecting current.

5. An image projection system comprising: image reproducing means including a cathode ray tube for producing an image on the screen of said cathode ray tube; projection lens means for projecting the image produced on the screen of said cathode ray tube onto a viewing screen, said viewing screen having a surface concaved at least in the horizontal direction for displaying an image having an inherent trapezoid-shaped distortion and an inherent fan-shaped distortion; horizontal and vertical deflection means producing horizontal and vertical deflection signals for deflecting electron beams in said cathode ray tube, said horizontal deflection means including first compensating means to modify the horizontal deflection signal at a vertical deflection rate, said first compensating means comprises modulating means for modulating a sawtooth-shaped horizontal deflecting current with a substantially sawtooth-shaped correcting signal having a vertical deflection period and first variable means for varying the amplitude of said substantially sawtooth-shaped correcting signal for controlling the beam deflection horizontally so that said image produced on said cathode ray tube viewing screen has a trapezoid-shaped distortion which is inversely related to said inherent trapezoid-shaped distortion; and said vertical deflection means including second compensating means to modify the vertical deflection signal at a horizontal deflection rate, said second compensating means comprises means for superposing a parabolic-shaped correcting signal having a horizontal deflection period on a vertical deflecting current and second variable means for varying the amplitude of said parabolic-shaped correcting signal for controlling the beam deflection vertically so that said image produced on said cathode ray tube viewing screen has a fan-shaped distortion which is inversely related to said inherent fan-shaped distortion, wherein said first variable means and said second variable means are ganged for simultaneous operation with each other, and whereby said image produced on said screen of said cathode ray tube is predistorted to compensate for said inherent trapezoid-shaped and fan-shaped distortions in said displayed image projected on said viewing screen.

* * * * *